E. L. WESCOTT.
COMBINED RACK AND SEAL FOR SUBMERGED MILK CONTAINERS.
APPLICATION FILED JAN. 30, 1913.

1,076,852.                                      Patented Oct. 28, 1913.

Witnesses
H. Davis

Inventor
E. L. Wescott

By
Attorney

UNITED STATES PATENT OFFICE.

EDMUND LANGWORTHY WESCOTT, OF TORONTO, ONTARIO, CANADA.

COMBINED RACK AND SEAL FOR SUBMERGED MILK-CONTAINERS.

1,076,852.          Specification of Letters Patent.          Patented Oct. 28, 1913.

Application filed January 30, 1913. Serial No. 745,114.

*To all whom it may concern:*

Be it known that I, EDMUND LANGWORTHY WESCOTT, resident of 152 Lee avenue, in the city of Toronto, county of York, Province of Ontario, in the Dominion of Canada, an American citizen, mechanical superintendent, have invented certain new and useful Improvements in Combined Racks and Seals for Submerged Milk-Containers, of which the following is a specification.

The invention relates to improvements in combined racks and seals for submerged milk containers, as described in the present specification and illustrated in the accompanying drawings that form part of the same.

The invention consists essentially in the novel construction and arrangement of parts, whereby in the treatment of milk in bottles the stopper is protected against contact with the outside fluid.

The objects of the invention are to effect economy in the matter of the stoppers employed as closures for the milk bottles, and in consequence use the ordinary paraffin pulp disk stoppers in place of a more expensive form and it is well known that the pulp stoppers are much more satisfactory, to devise a convenient form of rack, which will facilitate the process of pasteurizing milk and generally to provide a comparatively cheap and very durable rack for the purposes aforesaid.

Figure 1:
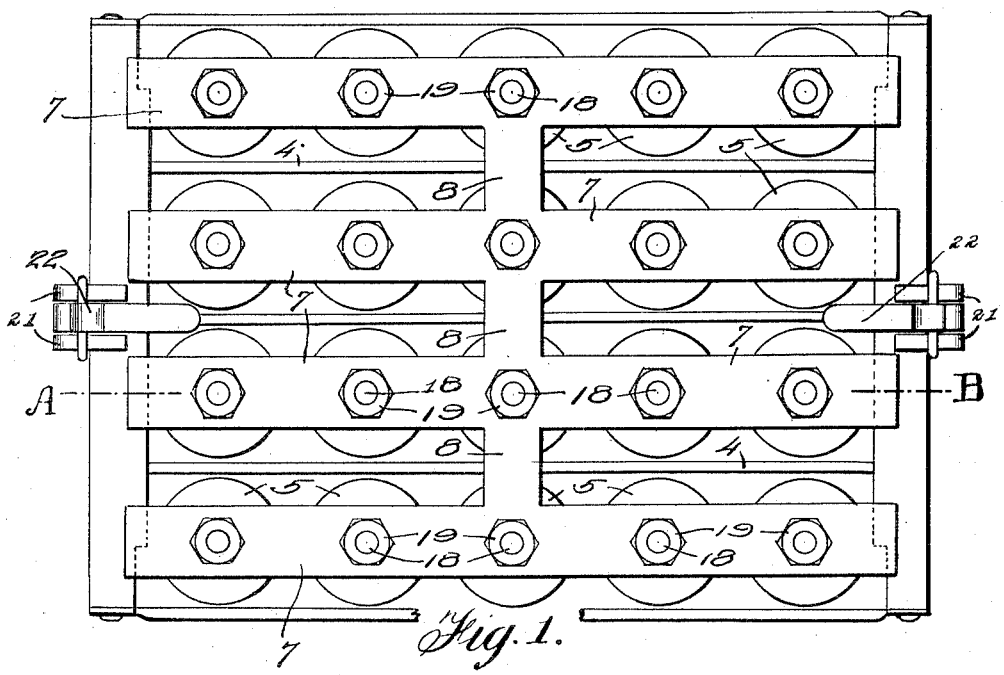
Figure 2:
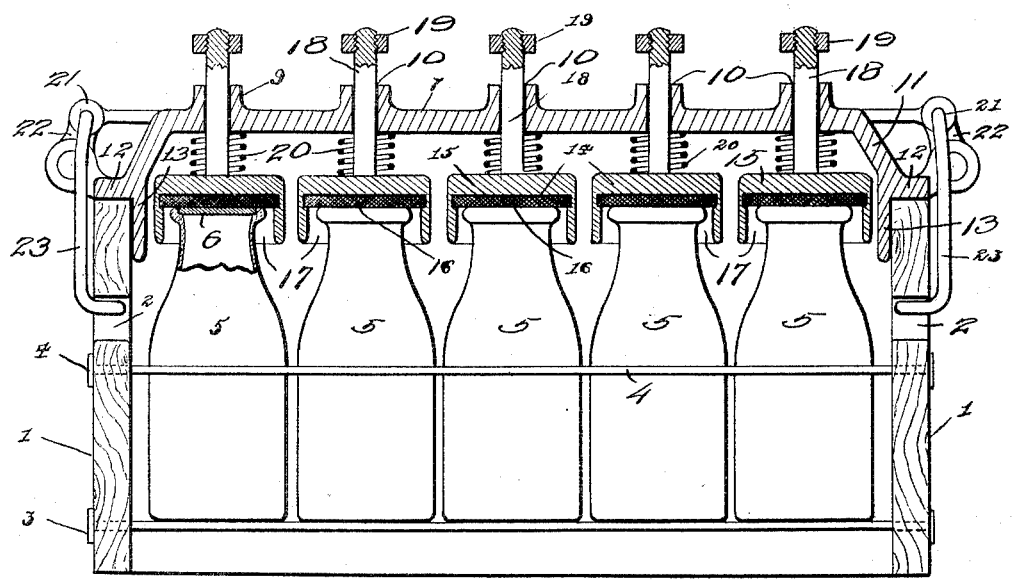

In the drawings Figure 1 is a plan view of the top of the rack. Fig. 2 is a longitudinal sectional view of the complete rack on the line A—B in Fig. 1.

Like numerals of reference indicate corresponding parts in each figure.

Referring to the drawings, 1 are the ends of the rack formed of wood or any suitable material, that will not be materially effected by immersion in hot or cold fluids and having the hook holes 2 therethrough a short distance below the top and midway between the side edges of the said ends.

3 are bars suitably fastened in the ends 1 adjacent to the bottom thereof and forming milk bottle supports, in fact forming the grid bottom to the rack.

4 are rods suitably secured in the ends 1 intermediate of the height thereof extending between and outside of the rows of the milk bottles, and completing the frame.

5 are milk bottles standing on the grid bottom between the rods 4 and having the disk closures 6.

7 is a grid top preferably formed of four parallel bars joined by the cross bars 8 in the center thereof, said bars having the bosses 9 and the orifices 10 through said bosses and the downwardly offset ends 11, said ends terminating in the horizontal flanges 12 and the vertical flanges 13 and seated on the top edge faces of the ends 1, said flanges extending completely across the grid top, therefore the grid top 7 sits on the top of the ends 1 when in position, the orifices 10 being centrally arranged over the milk bottles 5.

14 are inverted cups having the flat bottoms 15 and the rubber disks 16 covering said bottoms, the said walls of said cups encircling the tops of said milk bottles 5, while the rubber disks rest on the rims of the bottles. The said cups are some what larger than the neck and head of the milk bottle, so that there is an annular space 17 forming an air seal between each of said cups and each of said bottles.

18 are stems rigidly and centrally secured to the outside bottoms 15 and extending upwardly through the orifices 10 and having threaded upper ends extending outwardly beyond the bosses 9, each of said threaded upper ends having a nut 19 mounted thereon.

20 are spiral springs encircling the stems 18 between the grid top 7 and the cups 14, thereby exerting a constant pressure on the tops of said cups and bringing the rubbers 16 in to close contact with the bottles, when the grid top 7 is fastened.

21 are lugs extending outwardly from the grid top 7 at each end thereof, each lug having a suitable pivot orifice therethrough.

22 are crank levers, each of said cranks being pivoted at the end of one of its sections in a lug 21 and having a downwardly hanging hook 23 pivotally secured at the angle thereof, the other section of said crank acting as a handle. It will be thus seen that on throwing the crank levers 22 outwardly the hooks 23 will hang loosely but on turning said cranks inwardly and slipping the hooks in the hook holes 2, the hooks will be drawn up tightly against the top walls of said hook holes and as the angle of each of said crank levers is slightly beyond the pivot center of the lug, the said hooks are locked firmly in place. This or any other fastening will be quite suitable for the grid top, in fact many changes may be made in the construction of the device without departing from the spirit of the invention, so long as changes are kept within the scope of the claims for novelty following this description.

In the use of this rack the bottles are closed in the usual manner with disk stoppers and placed in the rack.

The grid top is placed in position, so that the inverted cups are over the tops of the bottles, the rubbers on the bottom coming into contact with said bottles, thus the bottles are held there firmly and the whole rack with the bottles can be immersed in the pasteurizing fluid without fear of the said fluid reaching the closures of said bottles, as the annular air spaces between the tops of the bottles and the side walls of the cups provide air seals, which prove a barrier to the passage of the outside liquid to the extreme tops of said bottles. The closures are further protected against moisture by the rubbers in the bottom of the cups, consequently the said disk closures will be kept perfectly dry during the pasteurizing treatment.

This description has been confined to the use of this rack for milk bottles, but it must be understood that it may be utilized otherwise.

What I claim is:—

1. In a device of the class described, a frame formed of ends and longitudinal bars, a grid top having bosses projecting upwardly therefrom and orifices through said bosses, a plurality of inverted cups having stems projecting upwardly through said orifices and means for fastening said grid top to said ends.

2. In a device of the class described, a frame formed of ends and longitudinal bars, a grid top having offsets at the end of its longitudinal bars terminating in horizontal and vertical flanges forming a seat on the tops of said ends, fasteners secured to said horizontal flanges and engaging the said ends, and a plurality of inverted cups suitably secured to said grid top and engaging the bottles therebelow.

3. In a device of the class described, a frame formed of ends and longitudinal bars, a grid top having bosses projecting upwardly therefrom and orifices through said bosses, a plurality of inverted cups having stems projecting upwardly through said orifices, and resilient means exerting a downward pressure on said cups, said cups being formed to provide an air chamber protecting the tops of the bottles they encircle and cover from contact with any liquid in which the frame may be immersed in a horizontal position, and means for fastening said grid top to said ends.

Signed at the city of Toronto, Ont., this 13th day of December, 1912.

EDMUND LANGWORTHY WESCOTT.

Witnesses:
W. G. HAMMOND,
M. S. NUECERT.

---

Copies of this patent may be obtained for five cents each, by addressing the "Commissioner of Patents, Washington, D. C."